US012140898B2

(12) United States Patent
Suganuma

(10) Patent No.: US 12,140,898 B2
(45) Date of Patent: Nov. 12, 2024

(54) IMAGE FORMING APPARATUS

(71) Applicant: CANON KABUSHIKI KAISHA, Tokyo (JP)

(72) Inventor: Takashi Suganuma, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/178,844

(22) Filed: Mar. 6, 2023

(65) Prior Publication Data

US 2023/0288862 A1 Sep. 14, 2023

(30) Foreign Application Priority Data

Mar. 8, 2022 (JP) ................................ 2022-035495

(51) Int. Cl.
*B65H 7/02* (2006.01)
*G03G 15/00* (2006.01)

(52) U.S. Cl.
CPC ................................ *G03G 15/6529* (2013.01)

(58) Field of Classification Search
None
See application file for complete search history.

(56) References Cited

U.S. PATENT DOCUMENTS

2012/0219337 A1* 8/2012 Endo ...................... G03G 15/70 271/264
2015/0102551 A1* 4/2015 Koga ...................... B65H 7/06 271/110

FOREIGN PATENT DOCUMENTS

JP H06-94444 A 4/1994
JP 2000-335783 A 12/2000
JP 2012-188288 A 10/2012

* cited by examiner

*Primary Examiner* — Leslie J Evanisko
(74) *Attorney, Agent, or Firm* — Canon U.S.A., Inc. IP Division

(57) ABSTRACT

An image forming apparatus to form an image on a recording medium includes a rotating member, a holding member, and an urging member. The rotating member is rotatable about a rotation axis between a first position and a second position and is rotatable from the first position in a direction opposite to the second position. The holding member holds the rotating member rotatably. The urging member urges the rotating member in a returning direction in which the rotating member is returned to the first position when the rotating member rotates from the first position in the direction opposite to the second position.

14 Claims, 7 Drawing Sheets

IMAGE FORMING APPARATUS

BACKGROUND OF THE DISCLOSURE

Field of the Disclosure

The present disclosure relates to an image forming apparatus including a rotating member which is rotatable.

Description of the Related Art

Conventionally, as a technique for detecting a conveyance position of a sheet (recording medium) in an image forming apparatus, it is known that a configuration is constituted by a sensor flag disposed in a conveyance path through which the sheet is conveyed, an urging spring configured to urge the sensor flag, and a sensor such as a photo interrupter. A leading edge of the sheet, which is being conveyed, contacts the sensor flag, directly, so that the sensor flag is swung against an urging force of the urging spring. It is generally known that the movement in the swinging of the sensor flag is detected by the sensor such as the photo interrupter, and the position information of the sheet is detected from the ON/OFF signal information of the sensor. In such a contact type sensing configuration, when the sensor flag is swung to return to a waiting position, the sensor flag collides with a positioning member which is disposed opposite to the sensor flag in the waiting position. As a result, the kinetic energy of the sensor flag is steeply converted into sound energy, which is released to the outside as collision sound, so that sound is generated every time a sheet is conveyed.

In order to reduce this sound, Japanese Patent Application Laid-Open No. H06-94444 proposes a method to reduce the momentum with which the sensor flag 10 abuts on the positioning member 12 by providing a shock absorbing member 11 on the positioning member 12 that receives the sensor flag 10, as shown in FIG. 9A and FIG. 9B. FIG. 9A and FIG. 9B are perspective views of the sensor flag 10 and the shock absorbing member 11 in the conventional art. The sensor flag 10 is provided with a contact portion 10*a* and an abutment portion 10*b*. The shock absorbing member 11 is fixed to the positioning member 12. FIG. 9A is a perspective view of the sensor flag 10 located in a waiting position WP. FIG. 9B is a perspective view of the sensor flag 10 located in a detection position DP. The sensor flag 10 is rotated from the waiting position WP to the detection position DP by the conveyed sheet pushing the contact portion 10*a*. When the sheet leaves the contact portion 10*a*, the sensor flag 10 returns from the detection position DP to the waiting position WP. According to the Japanese Patent Application Laid-Open No. H06-94444, when the sensor flag 10 returns from the detection position DP to the waiting position WP, the abutment portion 10*b* of the sensor flag 10 collides with the shock absorbing member 11 fixed to the positioning member 12. The shock absorbing member 11 mitigates the shock when the sensor flag 10 is positioned by the positioning member 12.

Japanese Patent Application Laid-Open No. 2000-335783 proposes a method to reduce the momentum with which the sensor flag abuts on a receiving portion by integrally providing a leaf spring to a sensor flag. Japanese Patent Application Laid-Open No. 2012-188288 also discloses that a positioning abutment portion moves a rotating portion in an axis direction while sliding on a sliding portion to move the rotating portion from a detection position to a waiting position, so that a kinetic energy when the positioning abutment portion lands on a positioning surface is distributed. This reduces the collision noise when the positioning abutment portion collides with the positioning surface in the waiting position.

However, the Japanese Patent Application Laid-Open No. H06-94444 mitigates the collision shock of the sensor flag 10 by causing the abutment portion 10*b* of the sensor flag 10 to collide with the shock absorbing member 11 fixed to the positioning member 12 when the sensor flag 10 returns to the waiting position WP as shown in FIG. 9A. The Japanese Patent Application Laid-Open No. 2000-335783 mitigates the collision shock of the rotating member by the leaf spring, but the rotating member collides with the positioning member disposed opposite to the rotating member in the waiting position. The Japanese Patent Application Laid-Open No. 2012-188288 distributes the kinetic energy of the collision, but the rotating member collides with the positioning member disposed opposite to the rotating member in the waiting position. In any of the conventional techniques, the rotating member collides with the positioning member in the waiting position to stop the rotating member in the waiting position, so that the collision sound is generated every time the rotating member returns from the detection position to the waiting position.

SUMMARY OF THE DISCLOSURE

According to an aspect of the present disclosure, an image forming apparatus configured to form an image on a recording medium includes a rotating member which is rotatable about a rotation axis between a first position and a second position and is rotatable from the first position in a direction opposite to the second position, a holding member configured to hold the rotating member rotatably, and an urging member configured to urge the rotating member in a returning direction in which the rotating member is returned to the first position when the rotating member rotates from the first position in the direction opposite to the second position.

Further features of the present disclosure will become apparent from the following description of exemplary embodiments with reference to the attached drawings.

DESCRIPTION OF THE EMBODIMENTS

Hereafter, the embodiments of the present disclosure will be described with reference to the accompanying drawings.

It should be noted that the dimensions, materials, and shapes of the components and their relative positions are not intended to limit the scope of the present disclosure to only those components unless otherwise specified. In the following description, the positional relationship between the top, bottom, left, right and front and rear will be described with reference to the state in which the image forming apparatus is viewed from the front (the viewpoint in FIG. 1).

First Embodiment (Image Forming Apparatus)

Figure 1:
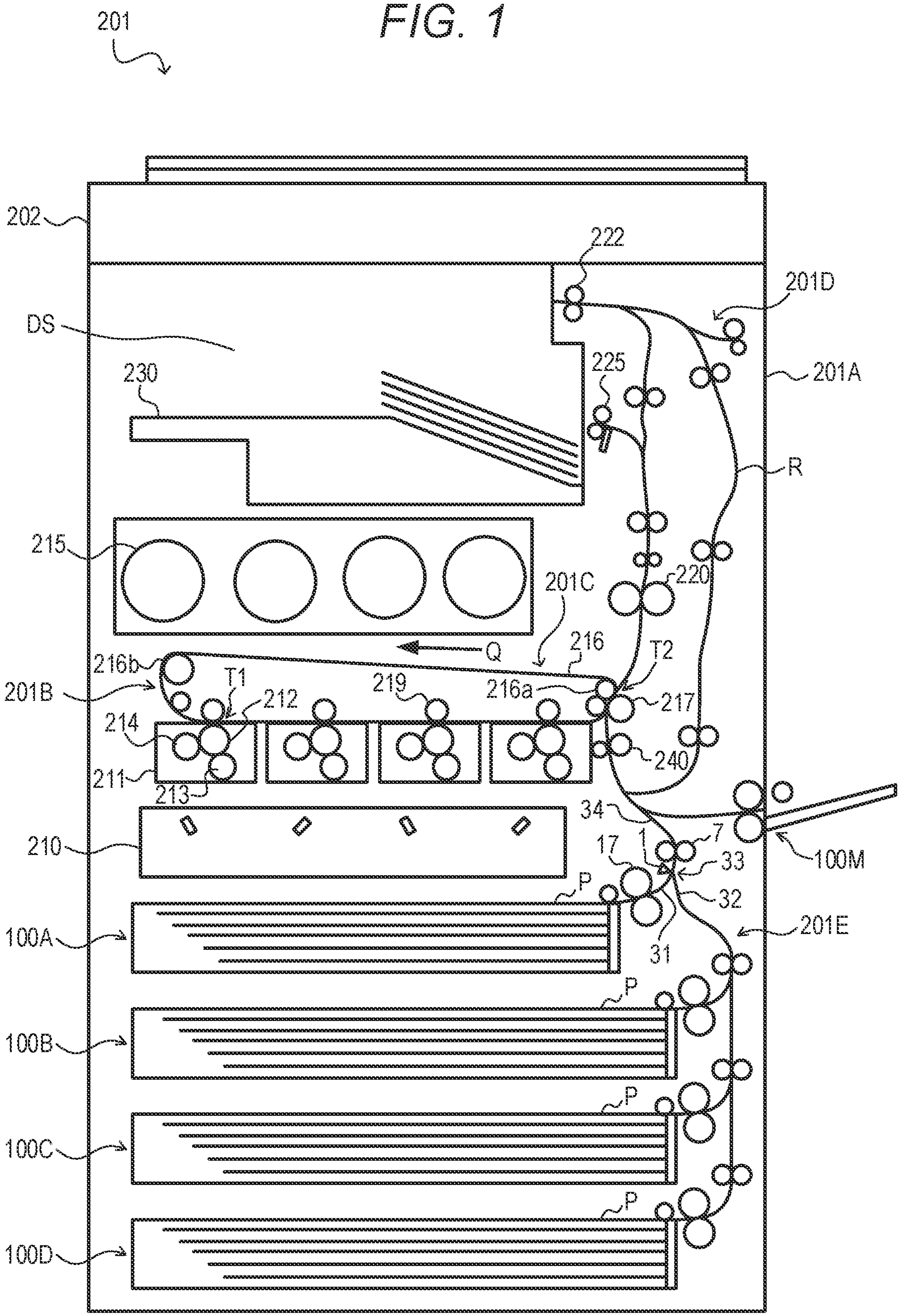
FIG. 1 is a cross-sectional view of an image forming apparatus.

FIG. 1 is a cross-sectional view of an image forming apparatus 201. The image forming apparatus 201 is an electrophotographic copying machine (for example, a digital copying machine) which forms a full-color image on a recording medium (hereinafter referred to as a sheet) using an electrophotographic method. In the embodiment, the image forming apparatus 201 is described using the electrophotographic copying machine as an example, but the image forming apparatus 201 is not limited to this. The image forming apparatus 201 may be an electrophotographic printer (for example, a color laser beam printer, a color LED (light emitting diode) printers), an MFP (multifunctional printer), a facsimile machine, or a printing machine. The image forming apparatus 201 is not limited to use an electrophotographic method but may be an inkjet printer which forms an image on a recording medium by an inkjet method.

The image forming apparatus 201 has an apparatus main body 201A, an image forming portion 201B, an intermediate transfer unit 201C, a reversing conveyance portion 201D, and a sheet feeding portion 201E. In the image forming apparatus 201, an image reading apparatus 202 configured to read an image of an original is provided on an upper portion of the apparatus main body 201A. The image forming portion 201B as an image forming unit is provided inside the apparatus main body 201A, and forms a toner image on a sheet P in cooperation with the intermediate transfer unit 201C. The toner image formed on the sheet P by the image forming portion 201B is fixed to the sheet P by a fixing portion 220 provided inside the apparatus main body 201A so that an image is formed on the sheet P. The sheet P on which the image is formed is discharged into a discharge space DS provided in the apparatus main body 201A between the image reading apparatus 202 and the image forming portion 201B. The discharge space DS is provided with a discharge tray 230 on which the discharged sheet P is stacked.

The sheet feeding portion 201E as a sheet feeding unit feeds the sheet P to the image forming portion 201B. The sheet feeding portion 201E has a plurality of cassette feeders disposed in a lower portion of the apparatus main body 201A and a manual feeder 100M disposed on a right side of the apparatus main body 201A. The plurality of cassette feeders include a first feeding cassette 100A, a second feeding cassette 100B, a third feeding cassette 100C, and a fourth feeding cassette 100D. The first feeding cassette 100A, the second feeding cassette 100B, the third feeding cassette 100C, and the fourth feeding cassette 100D are disposed in this order from the top.

The image forming portion 201B uses a so-called tandem type intermediate transfer method provided with a laser scanner 210, four process cartridges 211, and the intermediate transfer unit 201C. The four process cartridges 211 form a yellow toner image, a magenta toner image, a cyan toner image, and a black toner image, respectively. Each of the process cartridges 211 includes a photosensitive drum 212, a charger 213, a developing device 214, and a cleaner (not shown). Above the image forming portion 201B, four toner cartridges 215 containing yellow toner, magenta toner, cyan toner, and black toner, respectively, are detachably mounted to the apparatus main body 201A.

The intermediate transfer unit 201C has an intermediate transfer belt 216 looped around a drive roller 216*a* and a tension roller 216*b*. The intermediate transfer belt 216 is disposed above the four process cartridges 211. The intermediate transfer belt 216 is disposed to contact the photosensitive drums 212 of the four process cartridges 211. The intermediate transfer belt 216 is rotated in a counterclockwise direction (a direction indicated by the arrow Q) by the drive roller 216*a* driven by a drive portion (not shown). The intermediate transfer unit 201C is provided with four primary transfer rollers 219 abutting against an inner peripheral surface of the intermediate transfer belt 216 at respective positions opposite to the four photosensitive drums 212. Four primary transfer portions T1 are formed as nip portions between the intermediate transfer belt 216 and the photosensitive drums 212.

The image forming portion 201B is provided with a secondary transfer roller 217 abutting against an outer peripheral surface of the intermediate transfer belt 216 at a position opposite to the drive roller 216*a*. As a nip portion between the secondary transfer roller 217 and the intermediate transfer belt 216, a secondary transfer portion T2 in which the toner image borne on the intermediate transfer belt 216 is transferred to the sheet P is formed.

In each of the process cartridges 211, the charger 213 uniformly charges the surface of the photosensitive drum 212 that is rotating. The laser scanner 210 emits laser light of each color onto the uniformly charged surface of the photosensitive drum 212 to form an electrostatic latent image on the surface of the photosensitive drum 212. The developing device 214 supplies toner onto the surface of the photosensitive drum 212 to form each color toner image that is charged in negative polarity. A transfer bias voltage having positive polarity is applied to the primary transfer rollers 219 so that respective color toner images are sequentially transferred to the intermediate transfer belt 216 at the primary transfer portions T1, respectively (primary transfer). The respective color toner images are superimposed on the intermediate transfer belt 216 to form a full-color toner image on the intermediate transfer belt 216.

In parallel with the toner image formation process, the sheet P fed from the sheet feeding portion 201E is conveyed to a pair of registration rollers 240. The pair of registration rollers 240 corrects a skew feed of the sheet P. Then, the pair of registration rollers 240 starts conveying the sheet P so that the sheet P reaches the secondary transfer portion T2 in accordance with a timing when the full-color toner image formed on the intermediate transfer belt 216 reaches the secondary transfer portion T2. The full-color toner image borne on the intermediate transfer belt 216 is transferred to the sheet P at the secondary transfer portion T2 by applying the transfer bias voltage having positive polarity to the secondary transfer roller 217 (secondary transfer).

The sheet P on which the toner image is transferred is heated and pressurized by the fixing portion 220 so that a color image is fixed to the sheet P. The sheet P to which the image is fixed is discharged to the discharge tray 230 by a pair of discharge rollers 225 and stacked on the discharge tray 230. In the case of duplex printing in which images are formed on both surfaces of the sheet P, the sheet P which has passed through the fixing portion 220 so that the image is formed on the front side (the first surface) is switched back by a pair of reversing rollers 222, which is forwardly and reversely rotatable, provided in the reversing conveyance portion 201D. Then, the sheet P is conveyed again to the image forming portion 201B through a re-conveyance passage R, and an image is formed on the back side (the second surface) opposite to the front side. The sheet P with the images formed on both surfaces is discharged to the discharge tray 230 by the pair of discharge rollers 225.

(Sheet Detection Portion)

Figure 2:
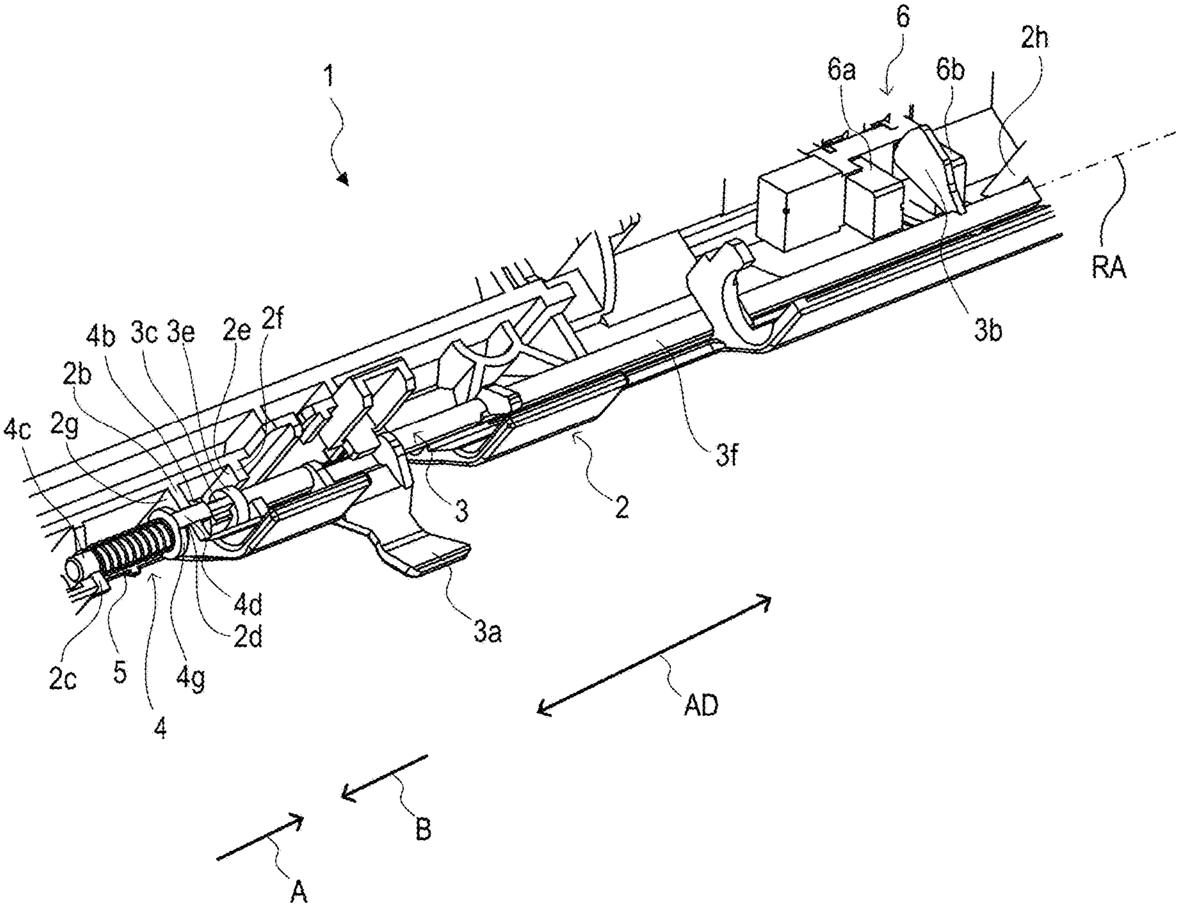
FIG. 2 is a perspective view of a sheet detection portion of a first embodiment.
Figure 3A:
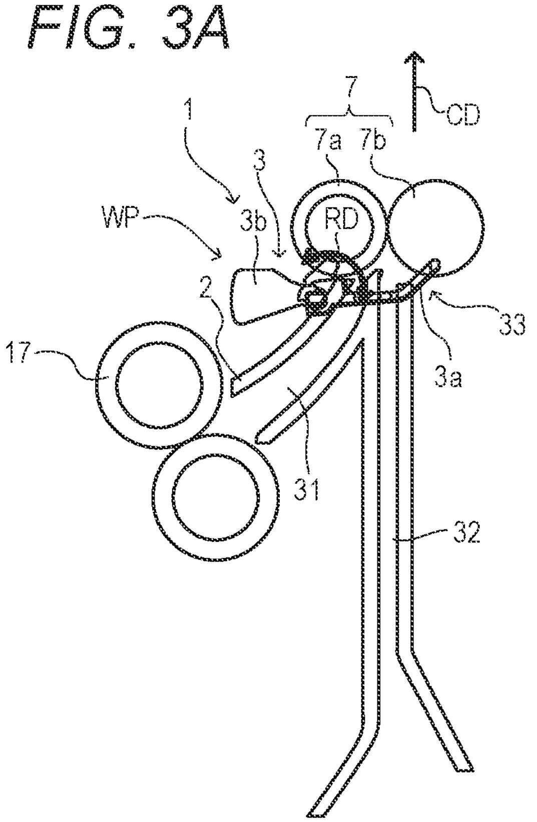
FIG. 3A and FIG. 3B are cross-sectional views of the sheet detection portion of the first embodiment.
Figure 3B:
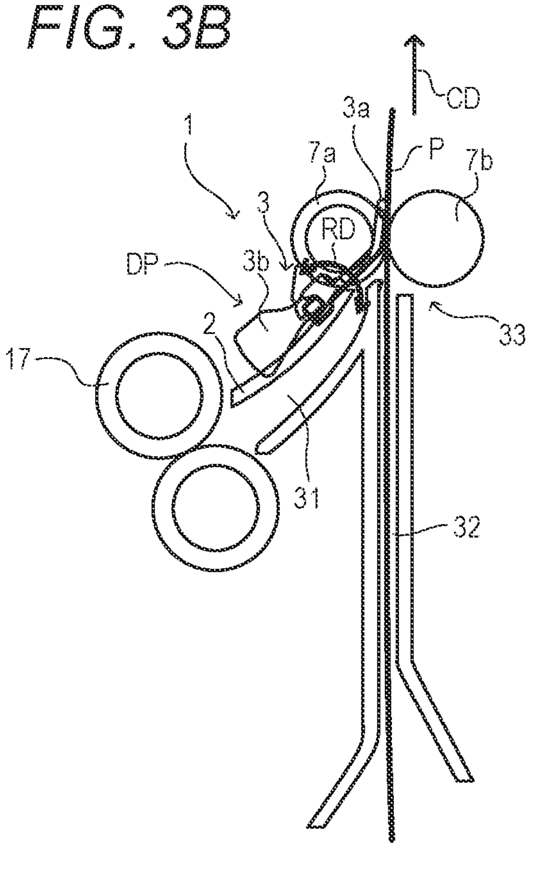

A sheet detection portion 1 will be described below with reference to FIG. 1, FIG. 2, FIG. 3A, and FIG. 3B. FIG. 2 is a perspective view of the sheet detection portion 1 of the first embodiment. FIG. 3A and FIG. 3B are cross-sectional views of the sheet detection portion 1 of the first embodiment. The sheet detection portion 1 is disposed at a junction 33 of a conveyance path 31 from the first feeding cassette 100A disposed at the top stage and a conveyance path 32 from the second feeding cassette 100*n*, the third feeding cassette 100C, and the fourth feeding cassette 100D disposed at lower stages. A pair of conveyance rollers 7 which conveys the sheet P to the pair of registration rollers 240 through a conveyance path 34 is disposed at the junction 33. The pair of conveyance rollers 7 includes a conveyance roller 7*a* disposed on the side of the first feeding cassette 100A with respect to the conveyance path 34 and a conveyance roller 7*b* disposed on the side opposite to the first feeding cassette 100A with respect to the conveyance path 34. The sheet detection portion 1 is disposed on the side of the conveyance roller 7*a* at the junction 33. The sheet detection portion 1 detects the sheet P conveyed from the conveyance path 31 to the junction 33 and the sheet P conveyed from the conveyance path 32 to the junction 33.

The sheet detection portion 1 includes a conveyance guide 2 (holding member) configured to guide the conveyance of the sheet P, a sensor flag 3 (rotating member), a pressing member 4 (cam member), a spring member 5 (urging member), and a photosensor 6. The conveyance guide 2 defines a part of the conveyance path 31 between a pair of conveyance rollers 17 configured to convey the sheet P fed from the first feeding cassette 100A and the pair of conveyance rollers 7. The conveyance guide 2 holds the sensor flag 3 rotatable (swingable) around a rotation axis RA orthogonal to a conveyance direction CD of the sheet P. The conveyance guide 2 holds the pressing member 4 movable in an axis direction AD (a rotation axis direction) along the rotation axis RA.

Figure 4:
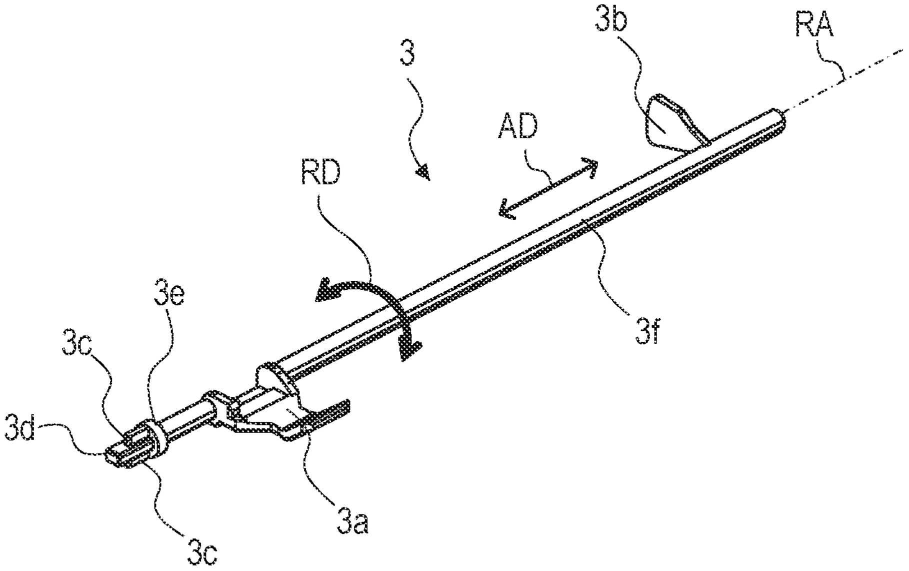
FIG. 4 is a perspective view of a sensor flag of the first embodiment.

FIG. 4 is a perspective view of the sensor flag 3 of the first embodiment. The sensor flag 3 has a contact portion 3*a*, a blocking portion 3*b*, protrusions 3*c*, a rotation shaft portion 3*d*, an abutment portion 3*e*, and a shaft portion 3*f*. The contact portion 3*a* and the blocking portion 3*b* extend radially from the shaft portion 3*f*. The protrusions 3*c*, the rotation shaft portion 3*d*, and the abutment portion 3*e* are provided at one end of the shaft portion 3*f*.

Figure 5:
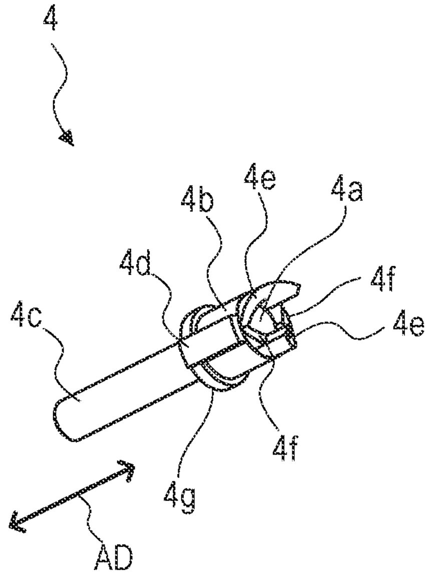
FIG. 5 is a perspective view of a pressing member of the first embodiment.

FIG. 5 is a perspective view of the pressing member 4 of the first embodiment. The pressing member 4 has a bushing portion 4*a*, a first sliding shaft portion 4*b* (first sliding portion), a second sliding shaft portion 4*c* (second sliding portion), a detent portion 4*d* (rotation regulating portion), first contact surfaces 4*e*, second contact surfaces 4*f*, and a spring receiving portion 4*g* (urging force receiving portion). The bushing portion 4*a* is provided on the first sliding shaft portion 4*b*. The two first contact surfaces 4*e* and the two second contact surfaces 4*f* are provided on one end of the first sliding shaft portion 4*b* in point symmetry. The detent portion 4*d* is provided on an outer periphery of the first sliding shaft portion 4*b*. The spring receiving portion 4*g* is provided between the other end of the first sliding shaft portion 4*b* and one end of the second sliding shaft portion 4*c*.

Referring to FIG. 2, the first sliding shaft portion 4*b* of the pressing member 4 is held movably in the axis direction AD by the first bushing portion 2*b* of the conveyance guide 2. The second sliding shaft portion 4*c* of the pressing member 4 is held movably in the axis direction AD by the second bushing portion 2*c* of the conveyance guide 2. The detent portion 4*d* of the pressing member 4 is fitted into a groove portion 2*d* formed in the first bushing portion 2*b* of the conveyance guide 2 to regulate the rotation of the pressing member 4 around the rotation axis RA. One surface of the spring receiving portion 4*g* of the pressing member 4 is configured to be able to abut against a first abutment surface 2*g* of the first bushing portion 2*b*. However, in the present embodiment, when the pressing member 4 and the sensor flag 3 are assembled into the conveyance guide 2, the spring receiving portion 4*g* does not abut against the first abutment surface 2*g*. The spring member 5 is attached to the second sliding shaft portion 4*c*. The spring member 5 of the first embodiment is a compression spring, but may be another elastic member such as rubber. One end of the spring member 5 abuts against the second bushing portion 2*c*. The other end of the spring member 5 abuts against the other surface of the spring receiving portion 4*g*. The spring member 5 urges the pressing member 4 along the axis direction AD in the direction (urging direction) indicated by the arrow A.

The rotation shaft portion 3*d* of the sensor flag 3 is inserted into the bushing portion 4*a* of the pressing member 4 so that the sensor flag 3 is held rotatably with respect to the pressing member 4. One end of the shaft portion 3*f* of the sensor flag 3 is held rotatably by a third bushing portion 2*f* of the conveyance guide 2. The other end of the shaft portion 3*f* of the sensor flag 3 is held rotatably by a fourth bushing portion 2*h* of the conveyance guide 2. The abutment portion 3*e* of the sensor flag 3 is configured to be able to abut against a second abutment surface 2*e* of the third bushing portion 2*f* of the conveyance guide 2. The movement of the sensor flag 3 in the direction (urging direction) indicated by the arrow A is regulated by the abutment portion 3*e* abutting against the second abutment surface 2*e* (movement regulating portion) of the third bushing portion 2*f*.

The two protrusions 3*c* protruding radially from the rotation shaft portion 3*d* of the sensor flag 3 are provided point-symmetrically with respect to the rotation axis RA. When the sensor flag 3 is rotated in a state in which the rotation shaft portion 3*d* of the sensor flag 3 is inserted into the bushing portion 4*a* of the pressing member 4, the two protrusions 3*c* can contact (abut) the first contact surfaces 4*e* or the second contact surfaces 4*f* of the pressing member 4 according to the rotational position of the sensor flag 3. When the protrusions 3*c* ride on the first contact surfaces 4*e* according to the rotation of the sensor flag 3, the protrusions 3*c* push the first contact surfaces 4*e* to move the pressing member 4 in the direction indicated by the arrow B along the axis direction AD. On the other hand, the protrusions 3*c* receive a rotation force and a force in the direction indicated by the arrow A along the axis direction AD from the pressing member 4 according to the slope shapes of the first contact surfaces 4*e*. The rotation shaft portion 3*d* extends from the protrusions 3*c* and is inserted into the bushing portion 4*a* of the pressing member 4 to be supported in a rotatable manner. The sensor flag 3 receives the force from the first contact surfaces 4*e* or the second contact surfaces 4*f* in the direction indicated by the arrow A along the axis direction AD, so that the abutment portion 3*e* of the sensor flag 3 abuts against the second abutment surface 2*e* of the third bushing portion 2*f* of the conveyance guide 2. The movement of the sensor flag 3 in the direction indicated by the arrow A is regulated by the abutment portion 3*e* of the sensor flag 3 abutting against the second abutment surface 2*e* of the third bushing portion 2*f* of the conveyance guide 2.

The conveyance guide 2 is provided with the photosensor 6 of a light-transmission type having a light emitting portion 6*a* and a light receiving portion 6*b*. When the sheet P conveyed from the conveyance path 31 or the conveyance path 32 contacts the contact portion 3*a* of the sensor flag 3 and presses the contact portion 3*a*, the sensor flag 3 is rotated and the blocking portion 3*b* blocks a light path between the light emitting portion 6*a* and the light receiving portion 6*b* of the photosensor 6. When the light path of the photosensor 6 is blocked, the output of the photosensor 6 is turned off. When the sheet P passes through the contact portion 3*a*, the sensor flag 3 is rotated by the urging force of the spring member 5 (urging member), and the blocking portion 3*b* retreats from the light path between the light emitting portion 6*a* and the light receiving portion 6*b* of the photosensor 6 so that the light path of the photosensor 6 is transmitted. When the light path of the photosensor 6 is transmitted, the output of the photosensor 6 is turned on. The photosensor 6 outputs a detection signal in response to the rotation of the sensor flag 3 to the detection position. The passing state of the sheet P is detected by the switching of ON/OFF of the detection signal of the photosensor 6.

As shown in FIG. 2, the pressing member 4 is supported by the conveyance guide 2 coaxially with the rotation axis RA of the sensor flag 3. The pressing member 4 is supported by the conveyance guide 2 so as to be translatable in the axis direction AD of the sensor flag 3 and so that the rotation of the pressing member 4 in the rotational direction RD (FIG. 3A) is regulated. The rotation shaft portion 3*d* of the sensor flag 3 is inserted into the bushing portion 4*a* of the pressing member 4, and the pressing member 4 supports the sensor flag 3 rotatably and can move in the axis direction AD with respect to the sensor flag 3.

The pressing member 4 is urged in the direction indicated by the arrow A along the axis direction AD by the spring member 5, so that the first contact surfaces 4*e*, the second contact surfaces 4*f*, or the first contact surfaces 4*e* and the second contact surfaces 4*f* come into contact with the protrusions 3*c* of the sensor flag 3. The movement of the pressing member 4 by the spring member 5 in the direction indicated by the arrow A is regulated by the contact of the first contact surfaces 4*e*, the second contact surfaces 4*f* or the first contact surfaces 4*e* and the second contact surfaces 4*f* with the protrusions 3*c* of the sensor flag 3. FIG. 3A is a view showing a state in which the sensor flag 3 is in a waiting position WP (first position). FIG. 3B is a view showing a state in which the sensor flag 3 is in a detection position DP (second position). When the sensor flag 3 is rotated from the waiting position WP to the detection position DP, the protrusions 3*c* of the sensor flag 3 push the first contact surfaces 4*e* to move the pressing member 4 in the direction indicated by the arrow B (FIG. 2) against the urging force of the spring member 5. The first contact surfaces 4*e* are formed in a first slope shape sloping to increase the urging force applied to the sensor flag 3 by contacting the protrusions 3*c* when the sensor flag 3 is rotated from the waiting position WP to the detection position DP. On the other hand, when the sensor flag 3 is rotated from the waiting position WP to a direction opposite to the detection position DP, the protrusions 3*c* of the sensor flag 3 push the second contact surfaces 4*f* to move the pressing member 4 in the direction indicated by the arrow B (FIG. 2) against the urging force of the spring member 5. The second contact surfaces 4*f* are formed in a second slope shape sloping to increase the urging force applied to the sensor flag 3 by contacting the protrusions 3*c* when the sensor flag 3 is rotated from the waiting position WP to the direction opposite to the detection position DP.

Figure 6A:
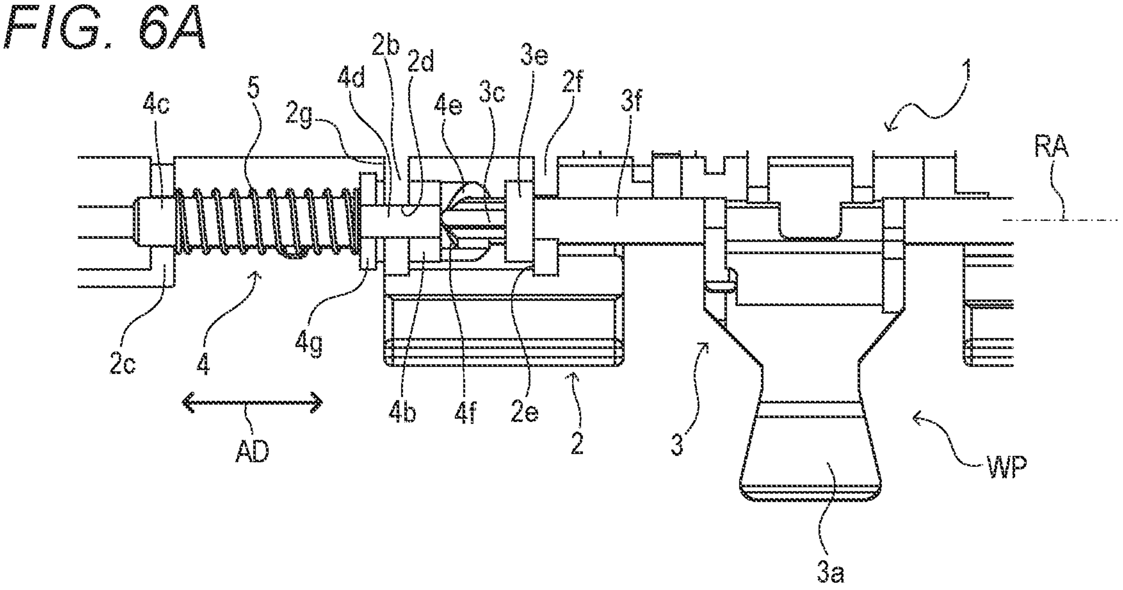
FIG. 6A, FIG. 6B, and FIG. 6C are explanatory views of movement of the pressing member by rotation of the sensor flag.
Figure 6B:
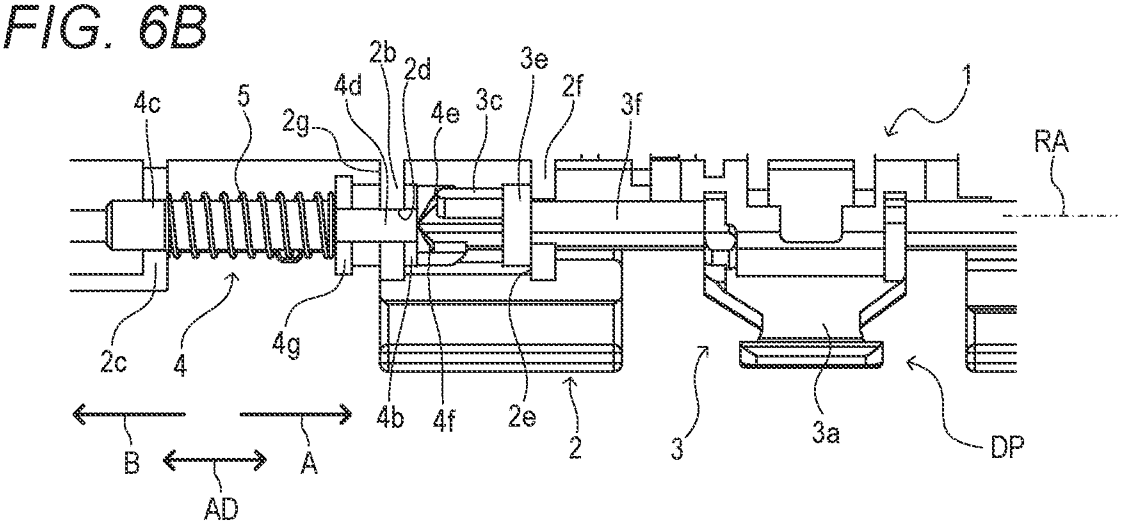
Figure 6C:
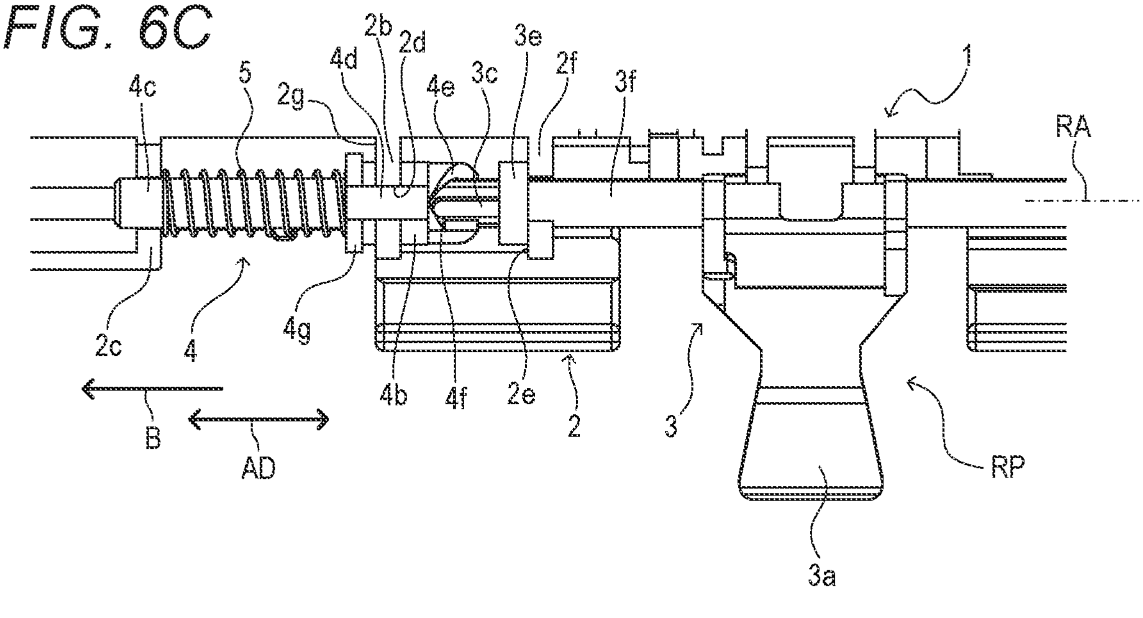

FIG. 6A, FIG. 6B, and FIG. 6C are explanatory views of the movement of the pressing member 4 by the rotation of the sensor flag 3. FIG. 6A is a view showing a position of the pressing member 4 when the sensor flag 3 is in the waiting position WP (first position). FIG. 6B is a view showing a position of the pressing member 4 when the sensor flag 3 is in the detection position DP (second position). FIG. 6C is a view showing a position of the pressing member 4 when the sensor flag 3 is in a return position RP (third position) after being rotated in the direction opposite to the detection position DP (second position).

The movement of the pressing member 4 when the sensor flag 3 is rotated from the waiting position WP shown in FIG. 3A and FIG. 6A to the detection position DP shown in FIG. 3B and FIG. 6B will be explained. When the sheet P is conveyed in a state in which the sensor flag 3 is in the waiting position WP shown in FIG. 3A and FIG. 6A, a leading edge of the sheet P comes into contact with the contact portion 3*a* of the sensor flag 3. As the contact portion 3*a* is pushed by the sheet P in association with the conveyance of the sheet P, the sensor flag 3 is rotated in the counterclockwise direction in FIG. 3A around the rotation axis RA. In association with the rotation of the sensor flag 3 in the counterclockwise direction, the protrusions 3*c* of the sensor flag 3 push the first contact surfaces 4*e* of the pressing member 4 in the direction indicated by the arrow B as shown in FIG. 6B. Since the rotation of the detent portion 4*d* of the pressing member 4 is regulated by the groove portion 2*d* (rotation regulating portion) of the conveyance guide 2, the pressing member 4 is moved by the protrusions 3*c* of the sensor flag 3 along the axis direction AD against the urging force of the spring member 5 in the direction indicated by the arrow B. As the pressing member 4 is moved in the direction indicated by the arrow B, the urging force (restoring force) of the spring member 5 is increased.

When the leading edge of the sheet P further presses the contact portion 3*a* of the sensor flag 3, the sensor flag 3 reaches the detection position DP shown in FIG. 6B. When the leading edge of the sheet P passes through the contact portion 3*a* of the sensor flag 3, the contact portion 3*a* contacts the surface of the sheet P, so that the sensor flag 3 is held in the detection position DP without being further rotated by the sheet P as shown in FIG. 3B. Note that the sensor flag 3 can be further rotated in the counterclockwise direction of FIG. 3B from the detection position DP. With this further rotation of the sensor flag 3 in the counterclockwise direction, the pressing member 4 can also be further moved in the direction indicated by the arrow B in FIG. 6B. Therefore, in the motion of the sensor flag 3 rotating from the waiting position WP to the detection position DP, the sensor flag 3 does not collide with any other member.

Next, the movement of the pressing member 4 when the sensor flag 3 is rotated from the detection position DP shown in FIG. 3B and FIG. 6B to the waiting position WP shown in FIG. 3A and FIG. 6A will be described. When the sheet P is further conveyed and a trailing edge of the sheet P passes through the contact portion 3*a* of the sensor flag 3, the contact portion 3*a* is not pushed by the sheet P. The sensor flag 3 is rotated to the waiting position WP by the rotational moment due to the center of gravity of the sensor flag 3 and the rotational force that the protrusions 3*c* receive from the first contact surfaces 4*e* by the urging force of the spring member 5. At that time, the protrusions 3*c* of the sensor flag 3 receive a force in a clockwise direction and a force in the direction indicated by the arrow A along the axis direction AD from the first contact surfaces 4*e* of the pressing member 4. Even if the protrusions 3*c* of the sensor flag 3 receive the force in the direction indicated by the arrow A along the axis direction AD from the first contact surfaces 4*e* of the pressing member 4, the sensor flag 3 is not moved in the direction indicated by the arrow A because the abutment portion 3*e* of the sensor flag 3 abuts against the second abutment surface 2*e* of the conveyance guide 2. Therefore, while the pressing member 4 is moved in the direction indicated by the arrow A by the urging force (restoring force) of the spring member 5, the first contact surfaces 4*e* rotates the protrusions 3*c* so that the sensor flag 3 is rotated in the clockwise direction in FIG. 3B. When the protrusions 3*c* of the sensor flag 3 reach valley portions (inflection point) between the first contact surfaces 4*e* and the second contact surfaces 4*f* of the pressing member 4, the sensor flag 3 returns to the waiting position WP.

Figure 9A:
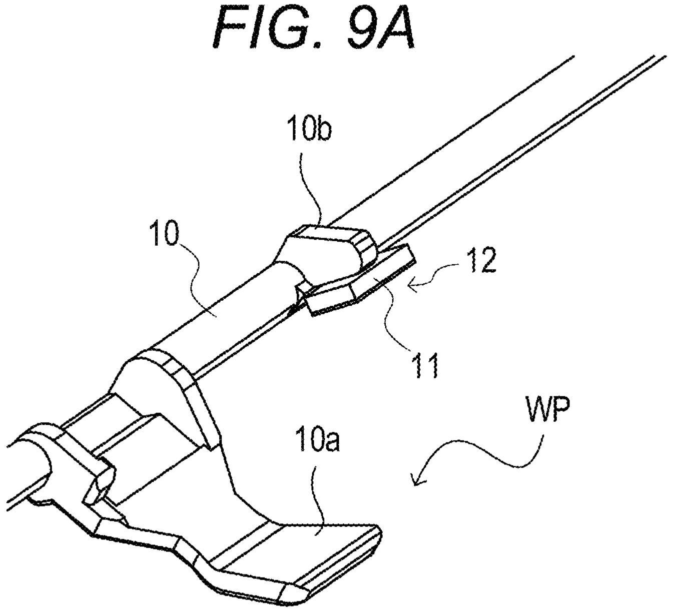
(Prior Art) FIG. 9A
FIG. 9A and FIG. 9B are perspective views of a sensor flag and a shock absorbing member in a conventional art.
Figure 9B:
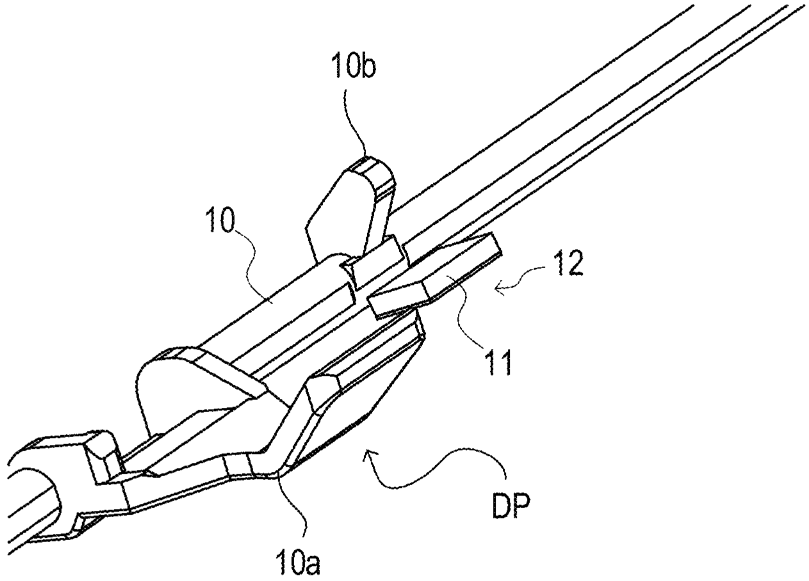
(Prior Art) FIG. 9B

However, when the sensor flag 3 returns from the detection position DP to the waiting position WP, the kinetic energy of the sensor flag 3 does not become zero. In the conventional art, as described with reference to FIG. 9A, the abutment portion 10*b* of the sensor flag 10 collides with the shock absorbing member 11 fixed to the positioning member 12 so that the sensor flag 10 is stopped in the waiting position WP. Therefore, in the conventional art, the collision sound is generated when the abutment portion 10*b* collides with the shock absorbing member 11. In contrast, in the first embodiment, the sensor flag 3 passes through the waiting position WP without the abutment portion 10*b* colliding with the shock absorbing member 11 in order to prevent the generation of the collision sound.

When the sensor flag 3 passes the waiting position WP and rotates in the direction opposite to the detection position DP, the protrusions 3*c* ride on the second contact surfaces 4*f* of the pressing member 4. The protrusions 3*c* of the sensor flag 3 push the second contact surfaces 4*f* in the direction indicated by the arrow B as shown in FIG. 6C. The pressing member 4 is moved in the direction indicated by the arrow B along the axis direction AD against the urging force of the spring member 5 by the protrusions 3*c* of the sensor flag 3. As the pressing member 4 is moved in the direction indicated by the arrow B, the urging force (restoring force) of the spring member 5 is increased. Thus, the kinetic energy in the rotational direction when the sensor flag 3 returns from the detection position DP to the waiting position WP is converted by the second contact surfaces 4*f* into the elastic energy of the spring member 5, which is translated in the axis direction AD, and then damped. The sensor flag 3 temporarily stops at the return position RP shown in FIG. 6C. Then, the sensor flag 3 is rotated in the return direction from the return position RP by the urging force (restoring force) of the spring member 5 to return to the waiting position WP and stop.

The sensor flag 3 is further rotatable in the clockwise direction in FIG. 3A from the return position RP in which the clockwise rotational kinetic energy switches to the counter-clockwise rotational kinetic energy. With this further rotation of the sensor flag 3 in the clockwise direction, the pressing member 4 is also further movable in the direction indicated by the arrow B in FIG. 6C. Therefore, in the operation in which the sensor flag 3 returns from the detection position DP to the waiting position WP, the sensor flag 3 does not collide with any other member. In this way, the sensor flag 3 can be returned from the detection position DP to the waiting position WP and stopped in the waiting position WP without providing any member colliding with the sensor flag 3 in the conveyance guide 2. Therefore, the shock when positioning the sensor flag 3 to the waiting position WP can be mitigated to prevent the generation of collision sound when the sensor flag 3 returns to the waiting position WP.

According to the first embodiment, in the operation in which the sensor flag 3 returns from the detection position DP to the waiting position WP, when the sensor flag 3 rotates in the direction opposite to the detection position DP beyond the waiting position WP, the reverse rotational direction force is generated to return the sensor flag 3 to the waiting position WP. The reverse rotational direction force enables the sensor flag 3 to return to the waiting position WP without colliding with any other member. According to the first embodiment, the kinetic energy of the sensor flag 3 in the rotational direction is converted to the elastic energy translational in the axis direction AD along the rotation axis RA to decay. As a result, the sensor flag 3 stops in the waiting position WP without colliding with any other member. According to the first embodiment, the generation of sound when the sensor flag 3 returns from the detection position DP to the waiting position WP can be reduced.

Second Embodiment

The second embodiment will be described below. In the second embodiment, the same structures as in the first embodiment are denoted by the same reference symbols and the description thereof will be omitted. Since the image forming apparatus 201 of the second embodiment is similar to the image forming apparatus 201 of the first embodiment, the description thereof will be omitted. In the first embodiment, the sensor flag 3 is provided with the protrusions 3*c*, and the pressing member 4 is provided with the first contact surfaces 4*e* and the second contact surfaces 4*f*. In contrast, in the second embodiment, a sensor flag 8 (rotating member) is provided with first contact surfaces 8*e* and second contact surfaces 8*f*, and a pressing member 9 is provided with protrusions 9*e*. Hereafter, the differences from the first embodiment will be mainly described.

Figure 7:
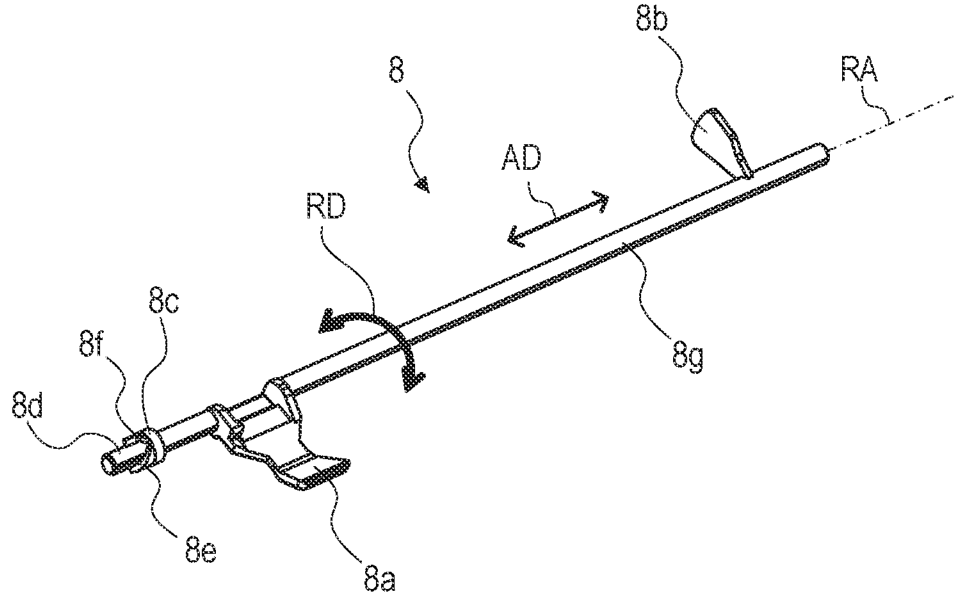
FIG. 7 is a perspective view of a sensor flag of a second embodiment.

FIG. 7 is a perspective view of the sensor flag 8 of the second embodiment. The sensor flag 8 has a contact portion 8*a*, a blocking portion 8*b*, an abutment portion 8*c*, a rotation shaft portion 8*d*, the first contact surfaces 8*e*, the second contact surfaces 8*f*, and a shaft portion 8*g*. The contact portion 8*a* and the blocking portion 8*b* extend radially from the shaft portion 8*g*. The abutment portion 8*c*, the rotation shaft portion 8*d*, the first contact surfaces 8*e*, and the second contact surfaces 8*f* are provided at one end of the shaft portion 8*g*. The two first contact surfaces 8*e* and the two second contact surfaces 8*f* are provided on an outer periphery of the rotation shaft portion 8*d* in point symmetry.

Figure 8:
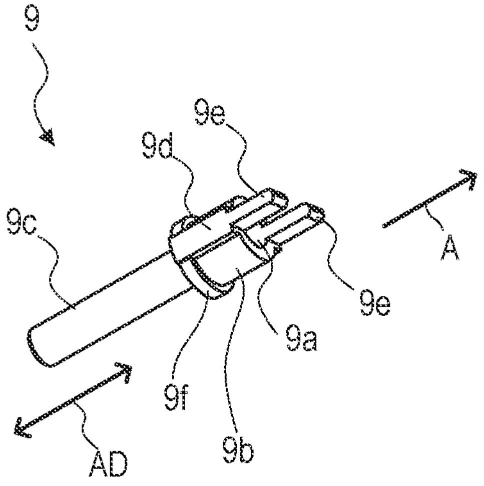
FIG. 8 is a perspective view of a pressing member of the second embodiment.

FIG. 8 is a perspective view of the pressing member 9 of the second embodiment. The pressing member 9 has a bushing portion 9*a*, a first sliding shaft portion 9*b*, a second sliding shaft portion 9*c*, a detent portion 9*d*, protrusions 9*e*, and a spring receiving portion 9*f*. The bushing portion 9*a* is provided on the first sliding shaft portion 9*b*. The detent portion 9*d* is provided on an outer periphery of the first sliding shaft portion 9*b*. The two protrusions 9*e* protrude from one end of the first sliding shaft portion 9*b* along the axis direction AD in the direction indicated by the arrow A. The spring receiving portion 9*f* is provided between the other end of the first sliding shaft portion 9*b* and one end of the second sliding shaft portion 9*c*.

The sensor flag 8 and the pressing member 9 of the second embodiment are attached to the conveyance guide 2 and operate in the same manner as the sensor flag 3 and the pressing member 4 of the first embodiment to achieve the same effect. According to the second embodiment, the generation of sound when the sensor flag 8 returns from the detection position DP to the waiting position WP can be reduced.

Incidentally, the sensor flag 3 and the sensor flag 8 are described as the rotating members in the first embodiment and the second embodiment, respectively. However, if the rotating member rotates between the first position and the second position, the rotating member is not limited to the sensor flag 3 and the sensor flag 8. In the first embodiment and the second embodiment, the first contact surfaces 4*e* are provided on the pressing member 4 and the first contact surfaces 8*e* are provided on the sensor flag 8, respectively, in order to provide the rotating member with the rotational force that returns the rotating member from the second position to the first position. However, the rotating member may be configured to return from the second position to the first position due to the self-weight of the rotating member. In this case, the first contact surfaces 4*e* of the pressing member 4 and the first contact surfaces 8*e* of the sensor flag 8 may be omitted.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-035495, filed Mar. 8, 2022, which is hereby incorporated by reference herein in its entirety.

What is claimed is:

1. An image forming apparatus configured to form an image on a recording medium, the image forming apparatus comprising:

a rotating member which is rotatable about a rotation axis between a first position and a second position and is rotatable from the first position in a direction opposite to the second position;

a conveyance guide configured to guide a sheet and hold the rotating member rotatably;

a cam member provided in the conveyance guide and configured to move the rotating member in a rotation axis direction of the rotating member by contacting the rotating member; and a spring member configured to urge the cam member so that the cam member is moved in the rotation axis direction toward the rotating member, wherein the cam member rotates the rotating member in a returning direction by an axial force received from the spring member, the returning direction being a direction in which the rotating member is returned to the first position when the rotating member rotates from the first position in the direction opposite to the second position.

2. The image forming apparatus according to claim 1, wherein the cam member has a contact surface contactable with a protrusion provided on the rotating member, and wherein the contact surface is formed in a slope shape sloping to increase an urging force applied to the rotating member by contacting the protrusion when the rotating member rotates from the first position in the direction opposite to the second position.

3. The image forming apparatus according to claim 1, wherein the conveyance guide has a regulating portion configured to regulate a movement of the rotating member in an urging direction in which the spring member urges the cam member.

4. The image forming apparatus according to claim 1, wherein the conveyance guide has a rotation regulating portion configured to regulate a rotation of the cam member.

5. The image forming apparatus according to claim 1, wherein the cam member has a first contact surface and a second contact surface which are contactable with a protrusion provided on the rotating member, wherein the first contact surface is formed in a first slope shape sloping to increase an urging force applied to the rotating member by contacting the protrusion when the rotating member rotates from the first position to the second position, and wherein the second contact surface is formed in a second slope shape sloping to increase the urging force applied to the rotating member by contacting the protrusion when the rotating member rotates from the first position in the direction opposite to the second position.

6. The image forming apparatus according to claim 5, wherein the cam member includes:

a bushing portion configured to hold the rotating member rotatably;

a first sliding portion and a second sliding portion which are held by the conveyance guide so as to be movable in the rotation axis direction;

a rotation regulating portion provided on an outer periphery of the first sliding portion and fitted into a groove portion of the conveyance guide to regulate a rotation of the cam member about the rotation axis;

the first contact surface and the second contact surface which are provided on one end of the first sliding portion; and an urging force receiving portion provided between another end of the first sliding portion and one end of the second sliding portion and configured to receive the urging force of the spring member.

7. The image forming apparatus according to claim 6, further comprising a sensor including a light emitting portion and a light receiving portion, wherein the rotating member includes:

a shaft portion rotatably held by the conveyance guide;

a contact portion extending radially from the shaft portion and contactable with the recording medium being conveyed;

a blocking portion extending radially from the shaft portion and configured to block an optical path between the light emitting portion and the light receiving portion of the sensor when the rotating member is rotated by the recording medium being conveyed pushing the contact portion;

the protrusion contactable with the first contact surface and the second contact surface of the cam member;

a rotation shaft portion provided on one end of the shaft portion and inserted into the bushing portion of the cam member so as to be held rotatably with respect to the cam member; and an abutment portion provided on the shaft portion and configured to abut against an abutment surface of the conveyance guide to regulate a movement of the rotating member in the rotation axis direction.

8. The image forming apparatus according to claim 7,
wherein the contact portion of the rotating member located in the first position is pushed by the recording medium being conveyed to cause the rotating member to rotate from the first position to the second position, and
wherein, when a trailing edge of the recording medium being conveyed passes the contact portion, the rotating member is rotated from the second position to the first position by the urging force of the spring member, and further rotates from the first position in the direction opposite to the second position against the urging force of the spring member, and then is returned to the first position by the urging force of the spring member.

9. The image forming apparatus according to claim 1,
wherein the rotating member has a contact surface contactable with a protrusion provided on the cam member, and
wherein the contact surface is formed in a slope shape sloping to increase an urging force applied to the rotating member by contacting the protrusion when the rotating member rotates from the first position in the direction opposite to the second position.

10. The image forming apparatus according to claim 1,
wherein the rotating member has a first contact surface and a second contact surface which are contactable with a protrusion provided on the cam member, and
wherein the first contact surface is formed in a first slope shape sloping to increase an urging force applied to the rotating member by contacting the protrusion when the rotating member rotates from the first position to the second position, and
wherein the second contact surface is formed in a second slope shape sloping to increase the urging force applied to the rotating member by contacting the protrusion when the rotating member rotates from the first position in the direction opposite to the second position.

11. The image forming apparatus according to claim 10,
wherein the cam member includes:
a bushing portion configured to hold the rotating member rotatably,
a first sliding portion and a second sliding portion which are held by the conveyance guide so as to be movable in the rotation axis direction,
a rotation regulating portion provided on an outer periphery of the first sliding portion and fitted into a groove portion of the conveyance guide to regulate a rotation of the cam member about the rotation axis, the protrusion, and
an urging force receiving portion provided between another end of the first sliding portion and one end of the second sliding portion and configured to receive the urging force of the spring member, and
wherein the protrusion is provided on one end of the first sliding portion.

12. The image forming apparatus according to claim 11, further comprising a sensor including a light emitting portion and a light receiving portion,
wherein the rotating member includes:
a shaft portion rotatably held by the conveyance guide,
a contact portion extending radially from the shaft portion and contactable with the recording medium being conveyed,
a blocking portion extending radially from the shaft portion and configured to block an optical path between the light emitting portion and the light receiving portion of the sensor when the rotating member is rotated by the recording medium being conveyed pushing the contact portion,
a rotation shaft portion provided on one end of the shaft portion and inserted into the bushing portion of the cam member so as to be held rotatably with respect to the cam member, and
an abutment portion provided on the shaft portion and configured to abut against an abutment surface of the conveyance guide to regulate a movement of the rotating member in the rotation axis direction, and
wherein the first contact surface and the second contact surface are contactable with the protrusion of the cam member.

13. The image forming apparatus according to claim 12,
wherein the contact portion of the rotating member located in the first position is pushed by the recording medium being conveyed to cause the rotating member to rotate from the first position to the second position, and
wherein, when a trailing edge of the recording medium being conveyed passes the contact portion, the rotating member is rotated from the second position to the first position by the urging force of the spring member, and further rotates from the first position in the direction opposite to the second position against the urging force of the spring member, and then is returned to the first position by the urging force of the spring member.

14. The image forming apparatus according to claim 1, wherein the rotating member is a sensor flag.

* * * * *